United States Patent
Theys et al.

(10) Patent No.: US 6,361,722 B1
(45) Date of Patent: Mar. 26, 2002

(54) METHODS OF PRODUCING CARBON-CARBON PARTS HAVING FILAMENTIZED COMPOSITE FIBER SUBSTRATES

(75) Inventors: William Theys, Greenville, WI (US); Donald E. Wantock, Winona, MN (US); Jeffrey J. Rose, Bel Air, MD (US); Martin T. Choate, Onalaska, WI (US)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 09/249,436

(22) Filed: Feb. 12, 1999

Related U.S. Application Data

(62) Division of application No. 08/832,015, filed on Apr. 2, 1997, now Pat. No. 5,871,844.

(51) Int. Cl.[7] .......................... B29C 43/02; B29C 67/00; D01F 9/12; C23C 16/26

(52) U.S. Cl. .......................... 264/29.2; 264/81; 264/113; 264/118; 264/122; 264/129; 264/136; 264/153; 264/257; 264/258; 264/324; 264/913; 112/440; 427/249.3; 427/249.4

(58) Field of Search .......................... 264/129, 81, 82, 264/83, 128, 136, 153, 257, 258, 324, 913, 29.2, 113, 118, 122; 428/408; 112/440; 427/249.3, 249.4

(56) References Cited

U.S. PATENT DOCUMENTS

| | | | | |
|---|---|---|---|---|
| 3,657,061 A | | 4/1972 | Carlson | 161/81 |
| 4,297,307 A | | 10/1981 | Taylor | 264/29.5 |
| 4,318,948 A | * | 3/1982 | Hodgson | 428/68 |
| 4,396,663 A | * | 8/1983 | Mitchell et al. | 428/111 |
| 4,457,967 A | | 7/1984 | Chareire | 428/212 |
| 4,780,363 A | | 10/1988 | Evans | 428/300 |
| 5,102,745 A | * | 4/1992 | Tatarchuk et al. | 428/604 |
| 5,190,124 A | | 3/1993 | Haneda | 188/218 XL |
| 5,230,946 A | | 7/1993 | Fisher | 428/212 |
| 5,377,792 A | | 1/1995 | Idesawa | 188/264 G |
| 5,413,738 A | * | 5/1995 | Lewis et al. | 252/502 |
| 5,607,770 A | * | 3/1997 | Lewis et al. | 428/408 |
| 5,609,707 A | | 3/1997 | Bazshushtari | 156/148 |
| 5,686,117 A | * | 11/1997 | Snyder et al. | 425/112 |
| 5,750,058 A | * | 5/1998 | Hecht et al. | 264/29.6 |
| 5,837,081 A | * | 11/1998 | Ting et al. | 156/89.26 |

* cited by examiner

Primary Examiner—Jan H. Silbaugh
Assistant Examiner—Stefan Staicovici
(74) Attorney, Agent, or Firm—Fitzpatrick, Cella, Harper & Scinto

(57) ABSTRACT

A method of producing a carbon-carbon part having a filamentized composite fiber substrate is provided. A substrate having a plurality of discontinuous filamentized fibers and a binder that binds said filaments together to form a composite substrate is provided, and carbon atoms are deposited onto the filaments at a predetermined temperature so that the binder is removed completely from the filaments and replaced with carbon atoms to from a dense carbon-carbon part.

16 Claims, 11 Drawing Sheets

METHODS OF PRODUCING CARBON-CARBON PARTS HAVING FILAMENTIZED COMPOSITE FIBER SUBSTRATES

CROSS-REFERENCE TO RELATED APPLICATION

This application is a division of application Ser. No. 08/832,015, filed on Apr. 2, 1997, now U.S. Pat. No. 5,871,844.

BACKGROUND OF THE INVENTION

This invention relates generally to carbon-carbon substrates and methods for producing parts using the substrates, and in particular, to a filamentized composite fiber substrate and method for producing a carbon-carbon part using the substrate.

A brake disc for an aircraft or an automobile requires a material having high heat resistance and long wear. For some applications, asbestos is used due to its heat resistance properties. In addition to asbestos, carbon may also be used, although conventional carbon-carbon brake products are expensive and historically restricted to aerospace or automotive racing applications.

Generally, a substrate of carbon fiber or carbon precursor may be used to produce a conventional carbon-carbon part with sufficiently high heat resistance values for use in, for example, an aircraft braking system. These conventional parts require a complicated time consuming process to produce a part with sufficient carbon to provide the necessary high temperature characteristics. These conventional carbon-carbon parts are expensive due to the complicated manufacturing process. There are a number of different types of substrates used to make conventional carbon-carbon parts including discontinuous carbon fiber molding compound, non-woven air lay carbon fiber substrates, woven carbon fiber substrates, or braided carbon fiber substrates.

To produce a conventional carbon-carbon part from a carbon fiber substrate that may be used, for example, for an aircraft brake disc, a plurality of carbon fiber substrates are available. These substrates may be stacked on top of each other to a desired thickness and then the stacked substrates may be needle-punched together, as is known in the art, to join or consolidate the substrates to each other by intermingling carbon fibers between the layers of substrates. This consolidation of the substrates creates a preform. The preform may then be batch carbonized, in which the preform is placed in an oven at 800 to 1100 degrees Celsius, to char the fiber of the substrate and increase the carbon content of the preform. Next, due to shrinking caused by the carbonization, the carbonized preform may be die cut to obtain the desired preform shape. These preforms may then have additional carbon atoms deposited on the carbon fibers of the preforms by using a chemical vapor deposition (CVD) process. In the CVD process, the preform is placed in an evacuated chamber and a carbon bearing gas, such as methane, is introduced into the chamber which when subjected to temperature releases carbon atoms that settle/infiltrate into the preform. The CVD process may increase the carbon content and density of the preform. The preform may then be heat treated to reorient the carbon atoms to a more energetically favorable configuration, machined if necessary, and treated with an anti-oxidant to form the finished carbon-carbon part.

The conventional preform process, as described above, and the conventional carbon-carbon parts have several problems. First, the batch carbonization process is slow and time consuming, taking hours or days which increases the cost of the part. Second, the batch carbonized preforms made from conventional substrates have a limited amount of carbon fiber surface area available so that fewer carbon atoms generated during the CVD process are able to settle/infiltrate into the preform. The lower level of carbon atom pick-up during the CVD process may require that the preforms undergo additional CVD processing and surface grinding steps to achieve the desired density. Third, it is difficult due to the nature of the process to add chemical or material additives to the preforms for the enhancement of performance characteristics because the additives may only be added to the preform after the consolidation step. Fourth, any material removed from the preform during the shaping and die cutting processes cannot be reused because there is no method for recycling this scrap material back into the preform manufacturing process. Thus, due to the above four problems carbon-carbon parts produced using the conventional preform process are typically too expensive to use for most commercial applications.

Another conventional substrate uses carbon fibers that are impregnated with a suitable binder and then the impregnated substrate may be compressed under heat and pressure to form the near net shape preform. The preform is then batch carbonized to char the binder via condensation of the binder into carbon. The binder may be liquid furfuryl alcohol polymer catalyzed with maleic anhydride. Once again, this substrate requires a batch carbonization process step in order to char the binder. Still another substrate for a carbon-carbon part uses carbon fibers, that may be oxidized polyacrylonitrile (PAN) fibers that may then be carbonized to form the carbon preform that may be subjected to the chemical vapor deposition (CVD) process. This substrate also requires a carbonization step.

None of these conventional materials for producing carbon-carbon parts permits the elimination of the batch carbonization step, which increases the cost of the final part. In addition, none of the conventional materials provide a sufficient surface area to permit an efficient rate of densification during the CVD process. The conventional materials also do not provide a method for recycling scrap pieces of the substrate for reintroduction into the preform process. As such, conventional carbon-carbon parts are too expensive to be used in most conventional commercial applications.

Thus, there is a need for a composite material substrate and a method for producing carbon-carbon parts using a substrate which avoids these and other problems of the known substrates, processes and carbon-carbon parts, and it is to this end that the present invention is directed.

SUMMARY OF THE INVENTION

The invention provides a composite material substrate having primarily filamentized carbon fibers held together by a binder that affords improved processability over a conventional carbon substrate. The cost of the parts produced using the filamentized composite substrate are reduced for several reasons, including that the filaments, primarily carbon, in the substrate have more surface area exposed, so that fewer fibers are required to achieve the same densification levels and less of the substrate is needed for each final part. In addition, any scraps of the substrate generated during the process may be easily recycled back into the substrate manufacturing process. Carbonized carbon fibers used in the filamentized composite substrate permit the elimination of a batch carbonization step currently used with conventional substrates. Due to the substrate having a higher surface area than conventional substrates, a higher percentage of carbon atoms are also attached to the filaments during the chemical vapor deposition (CVD) process, which reduces the time required to produce a part with a desired density. The binder used in the substrate is readily removed during the CVD process so a batch carbonization step is not necessary. The reduced cost may make these carbon-carbon parts manufactured from filamentized composite substrates suitable for conventional commercial applications.

The invention also provides a substrate for a preform that may have a plurality of discontinuous fibers, primarily carbon, held together by a binder compound wherein the binder compound may be readily displaced during the CVD process. Thus, the binder may hold the carbon filaments in place prior to the CVD process and then may evaporate during the CVD process and be replaced by the carbon atoms.

The invention further provides a substrate that may be produced using a paper process in which the fibers, primarily carbon, and the binder may be combined together to form a substrate that may be used to manufacture a carbon-carbon part. The process for producing a filamentized composite substrate may permit additional chemicals or materials to be easily added to the substrate via the paper manufacturing process, to enhance a variety of characteristics of the substrate and the carbon-carbon part made from the substrate, such as its hardness, coefficient of friction, or oxidative resistance. In another embodiment of the invention, a completed filamentized composite substrate may have resin added to the substrate via a prepregging process in order to increase the friction/wear results. This same resin may also be used as a vehicle, such as a high solids solution, to distribute special additives into the filamentized composite substrate to enhance other properties of the substrate and the carbon-carbon part made from the substrate. In another embodiment of the invention, typically the preform for a carbon-carbon part is of a thickness greater than that of the individual filamentized composite substrate sheet, therefore the preform may consist of a plurality of filamentized composite sheet substrates. This plurality would constitute a multilayer construction to achieve the desired preform thickness. Thus, the filamentized composite substrate provides an opportunity to easily tailor the through thickness properties of the preform by altering the properties of individual filamentized composite substrates that are used to manufacture the preform. As an example, the resin content of the inner layer substrates of a preform may be higher than those of the outer layers to increase the density of the preform at its interior, which may result in substantially reduced chemical vapor deposition (CVD) processing time.

Thus, in accordance with the invention, a carbon-carbon part having a filamentized composite substrate is provided having a substrate of a plurality of discontinuous filaments, primarily carbon, and a binder that binds said filaments together to form a substrate, and a plurality of substrates consolidated to form a preform, and a plurality of carbon atoms deposited onto the filaments at a predetermined temperature and pressure such that said binder is removed completely from said filaments and replaced by said carbon atoms to form a dense carbon-carbon part.

A method for producing a carbon-carbon part is also provided, comprising producing a substrate, the substrate comprising a plurality of discontinuous filaments, primarily carbon, and a binder that binds said filaments together to form a substrate, producing a preform by consolidating said substrates, and depositing carbon atoms, by chemical vapor deposition (CVD) at a predetermined temperature and pressure onto the filaments such that said carbon atoms replace said binder within said preform and said carbon atoms density said preform to form a carbon-carbon part.

DETAILED DESCRIPTION OF A PREFERRED EMBODIMENT

The invention is particularly applicable to using a filamentized composite substrate to produce carbon-carbon parts for friction applications. It is in this context that the invention will be described. It will be appreciated, however, that the system and method in accordance with the invention has greater utility. To better understand the invention, a brief description of the conventional carbon fiber substrate and the conventional process for producing carbon-carbon parts will be provided.

Figure 1:
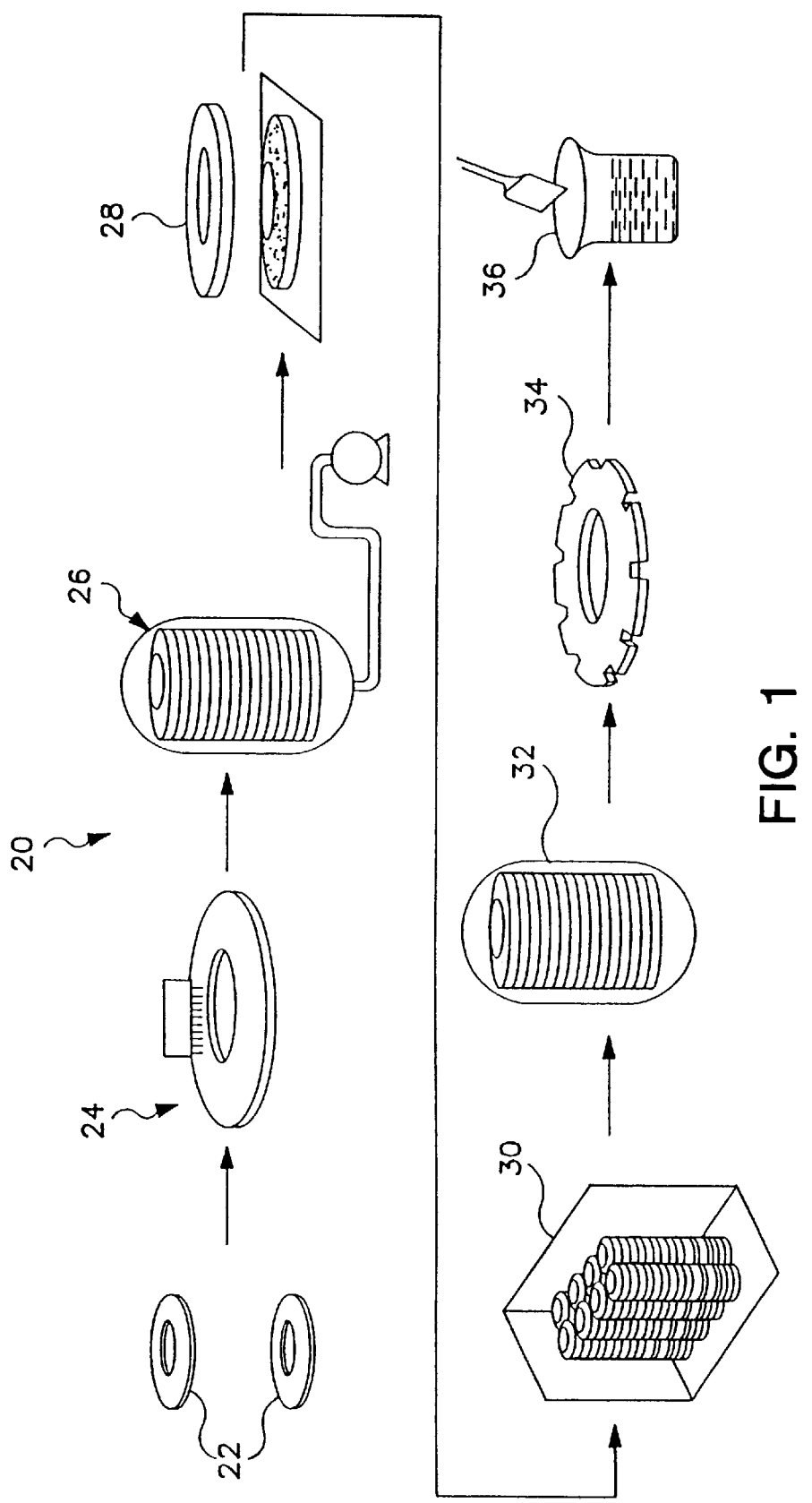
FIG. 1 is a diagram illustrating a conventional process for producing carbon-carbon parts.

FIG. 1 is a diagram illustrating a conventional process 20 for producing a carbon-carbon part, such as a brake disc for an aircraft braking system. In a first step 22, a plurality of commercially available carbon fiber substrates may be obtained. In step 24, the substrates may be stacked on top of each other to a desired thickness. The stacked substrates may then be needle-punched, as is known in the art, to reorient some of the fibers from a particular substrate layer through to another substrate layer so that some of the fibers within and between the substrates become intermingled through the Z plane direction. The fibers in the stacked substrates are intermingled together and the interlaminar strength of the resulting preform is increased. Due to shrinkage that may occur during the batch carbonization step, the preform must be designed to be oversized. Next in step 26, the preforms may be batch carbonized in an oven, for a period of several hours up to a few days, at approximately 800 to 1100 degrees Celsius in a non-oxidizing atmosphere. During the carbonization process a condensation of the preform material occurs causing the preform to shrink somewhat and the resulting carbonized preform may be die cut in step 28 to the desired size.

The carbonized preform may now be densified, in step 30, in which carbon atoms may be added to fill in the free volume between carbon fibers resulting in increased part density. Generally, to add the carbon atoms, a chemical vapor deposition (CVD) process is used in which the carbonized parts are placed in a heated evacuated chamber and a carbon containing gas, such as methane, is introduced into the chamber so that the carbon atoms from the methane may impregnate the preform. However, the conventional preform composed of bundled fiber filaments may have a limited amount of carbon fiber surface area for the carbon atoms to deposit on, which may reduce the rate of densification. Conventional preforms containing bundled fiber filaments and having non-uniform pore size openings may be prone to surface clogging requiring the surface to be ground followed by additional chemical vapor deposition (CVD) processing.

Once desired densification has been reached, in step 32, the densified part may be heat treated to reorient the carbon atom matrix to a more energetically favorable configuration. Next, in step 34, the carbon-carbon part is machined to the desired final dimensions. Finally, in step 36, an anti-oxidant layer may be added to exposed surfaces of the part. The anti-oxidant layer is designed to prevent surface oxidation of the carbon-carbon part.

Figure 2:
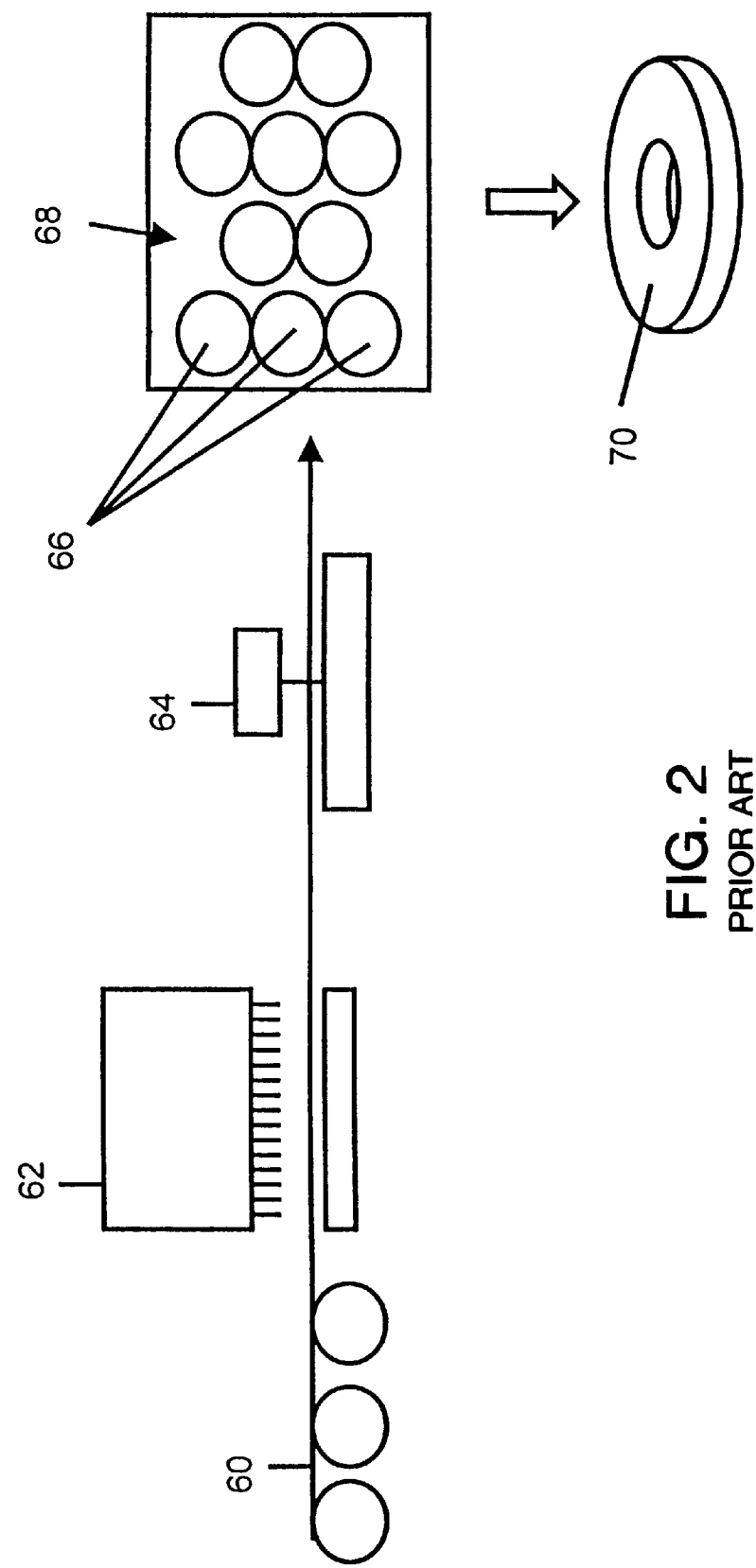
FIG. 2 is a diagram of a conventional process for forming a preform.

FIG. 2 is a diagram of a conventional process for forming a preform. A plurality of mats 60 of bundled filament substrate on woven or discontinuous chopped tow may be needle-punched by a needle loom 62 to intermingle the filaments from each substrate together. A part cutter 64 may cut circular parts out of the plurality of mats. The results of the part cutting is a plurality of circular parts 66 and a large amount of trim 68 that cannot be easily recycled. A finished consolidated preform 70 is shown.

Figure 3:
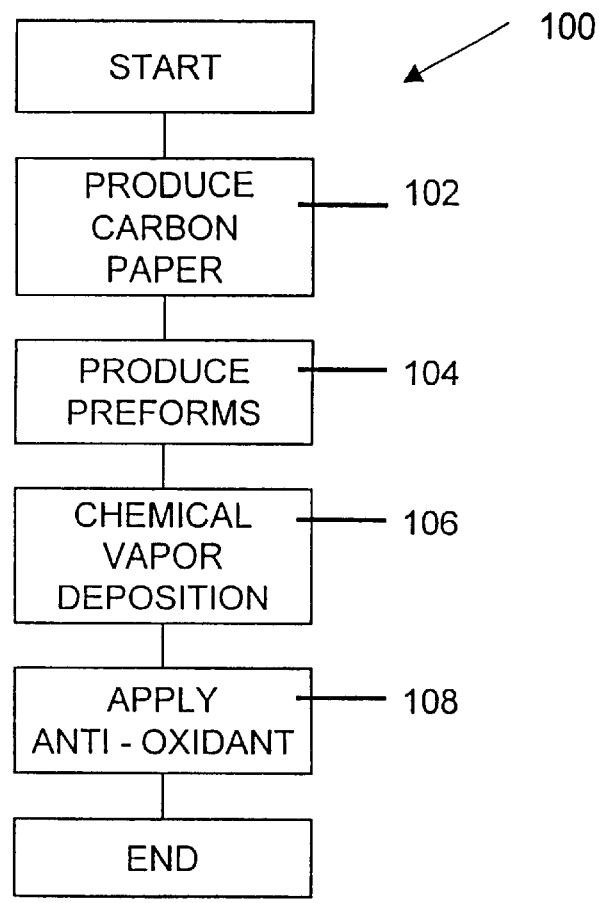
FIG. 3 is a flowchart illustrating an overall process for producing carbon-carbon parts with filamentized composite substrates in accordance with the invention.
Figure 7:
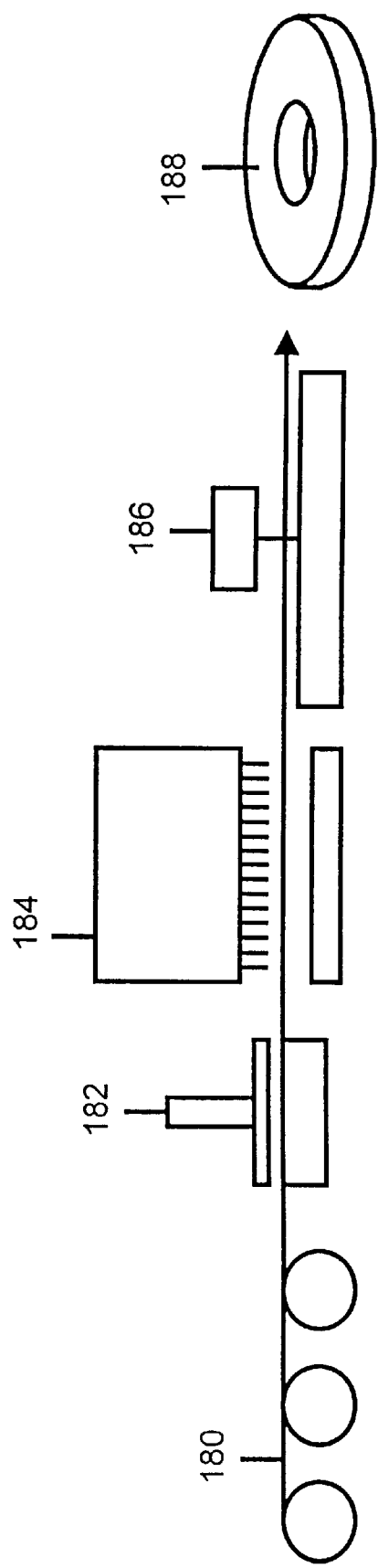
FIG. 7 is a diagram illustrating a third embodiment of a process for producing preforms in accordance with the invention.
Figure 8:
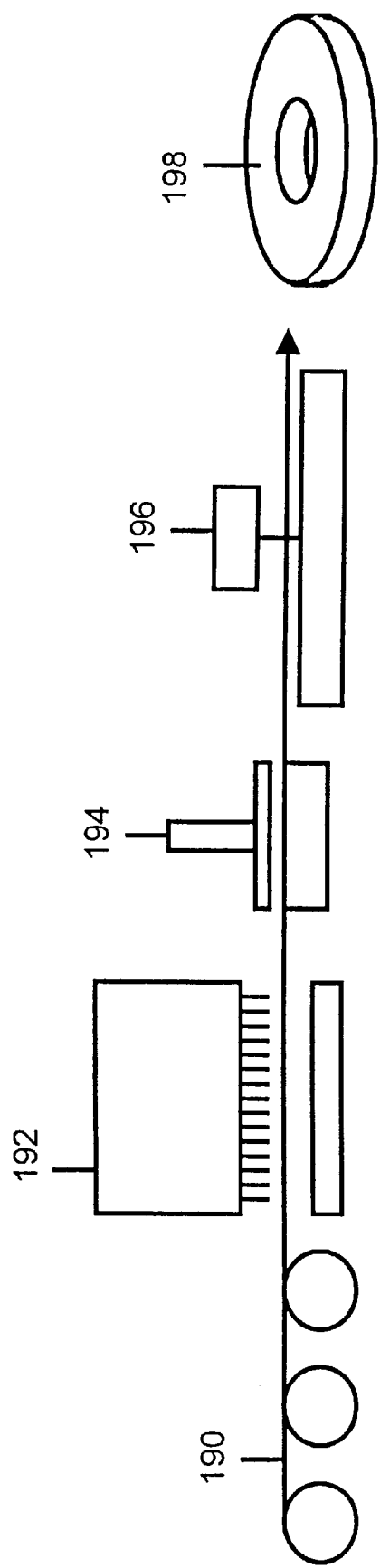
FIG. 8 is a diagram illustrating a fourth embodiment of a process for producing preforms in accordance with the invention.
Figure 9:
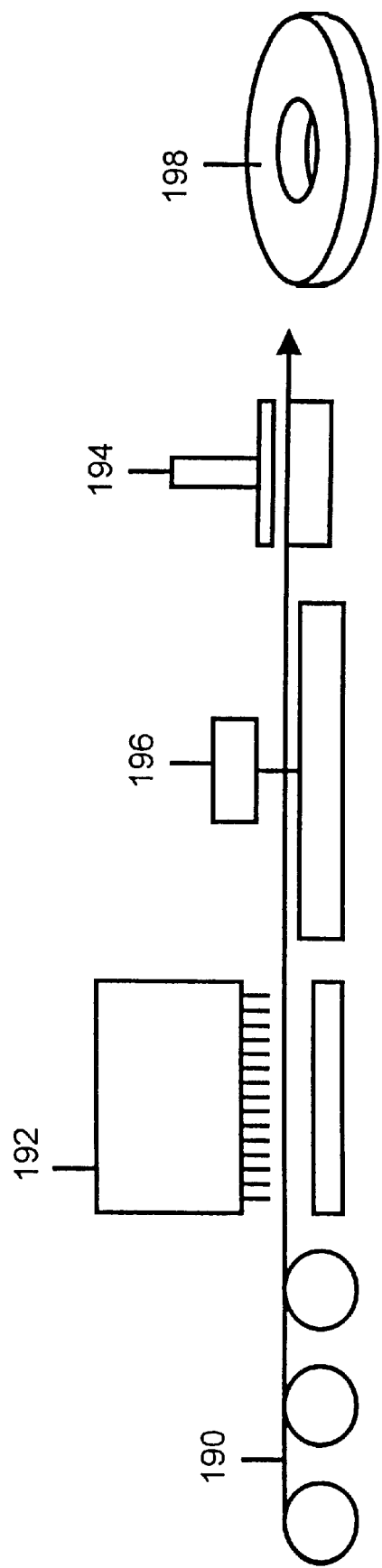
FIG. 9 is a diagram illustrating a fifth embodiment of a process for producing preforms in accordance with the invention.

FIG. 3 is a flowchart of an overall method 100 for producing carbon-carbon parts from a filamentized composite substrate in accordance with the invention. In a first step 102, a composite paper substrate is produced in accordance with the invention. The composite paper substrate will be referred to hereinafter as a filamentized composite (FC) substrate. The FC substrate may have a plurality of discontinuous fibers, primarily carbon, such as polyacrylonitrile (PAN) based carbon fibers and/or Pitch based carbon fibers with random orientations bound by an alcohol based binder. The alcohol based binder, as described below, may have a sufficiently low flash point so that the alcohol based binder may be easily displaced from the carbon filaments during the CVD process. In addition, resins and material additives may be added to the FC substrate that enhance certain characteristics of the finished carbon-carbon part. The details of the production of the FC substrate and the components of the FC substrate will be described below with reference to FIG. 4. The production of the preforms may include stacking a plurality of layers of the FC substrate onto each other and, in a first embodiment, needle-punching the layers together as described below with reference to FIG. 5, or in a second embodiment, pressing the layers together as described below with reference to FIG. 6, or in a third embodiment, pressing and then needling the preforms as shown in FIG. 7, or in a fourth and fifth embodiment, needling and pressing the preforms as shown in FIGS. 8 and 9. Additional consolidation methods may include consolidation by combination of needle-punching and pressing, in either order. The cutting of preforms to shape may be performed either prior to consolidation, at the FC substrate stage, or subsequent to consolidation, at the preform stage.

With any of the aforementioned methods for producing the preforms, any scrap material generated in cutting the shapes of the preform may be recycled. The scraps may be reintroduced back into the composite paper production process. The alcohol based binder in the FC substrate is soluble in water so that scrap material may be reused to make additional FC substrates. By contrast, in the conventional process described above, any scrap material generated during the cutting process must be discarded because there is no easy way of recycling the scrap material back into the original form required by the process. The preforms produced may have a plurality of substrate layers depending on the desired application thickness. The PAN based and/or Pitch based carbon fibers utilized are previously carbonized in an economical continuous process and preforms produced from same fibers do not require any further carbonization. In addition, the binder in the FC substrate may be evaporated cleanly from the carbonized filaments during the CVD process, as described below, so that the carbonization of the binder is also not required. Therefore, the preforms produced using the FC substrate in accordance with the invention do not require a carbonization step, which reduces considerably the time necessary to produce the carbon-carbon part and reduces its cost.

Once the preforms have been produced from the FC substrate, the preforms may be subjected to a CVD process 106 in which the substrates are placed within an evacuated heated chamber. Then, a carbon containing gas, such as methane, is introduced into the chamber, and the carbon atoms from the gas may settle/infiltrate onto the filaments, filling in the free volume between the filaments to increase the part density. An example of a FC substrate showing the increased preform surface area prior to the chemical vapor deposition (CVD) process will be described below with reference to FIGS. 10–15. The polyacrilonitrile (PAN) based and/or Pitch based filaments and other filament types in the FC substrate may have a large amount of surface area so that a large amount of carbon atoms may better impregnate the preform reaching the desired densification at a faster densification rate than conventional carbon fiber preforms such as those composed of bundled carbon filament substrates. In addition, the larger amount of surface area due to a higher and more uniform surface porosity makes the preform composed of FC substrates less prone to surface clogging during the CVD process. Therefore, the grinding step(s) and additional CVD step(s) required for a conventional part that has a propensity for surface pore clogging may not be required. Thus, the preforms made of the FC substrate construction, in accordance with the invention, may have a higher densification rate than a conventional part and may not require grinding step(s) or an additional CVD step(s), which further reduces the cost of the FC substrate based carbon-carbon parts. After the CVD process and heat treatment process, an anti-oxidant layer may be applied to the exposed surface of the part in step 108 to prevent surface oxidation. After the anti-oxidant layer has been applied, a completed carbon-carbon part has been produced. Now, a method of producing the composite paper will be described.

Figure 4:
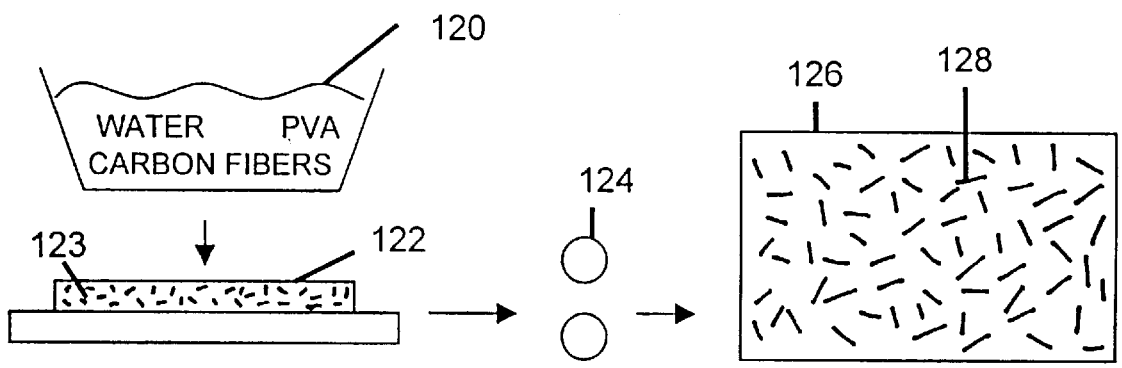
FIG. 4 is a diagram illustrating a process for generating the composite paper in accordance with the invention that is part of the overall process shown in FIG. 3.

FIG. 4 is a diagram illustrating a process for producing the composite paper that may be used for the carbon-carbon parts in accordance with the invention. In a first step 120, a plurality of carbonized PAN based and/or carbonized Pitch based fibers and other type fibers and an alcohol based binder may be combined together in an aqueous solution. The binder may preferably be polyvinyl alcohol (PVA) as described below. The fibers used for the paper may be discontinuous fibers that may be oriented in random directions which increases the strength of the paper. The fibers used to produce the paper may preferably be carbonized polyacrylonitrile (PAN) based or carbonized Pitch based carbon fibers or a refractory type fiber or metallic type fiber or combination thereof, where preferably 50 percent of the fibers are 0.50 inches long and 50 percent of the fibers are 1.00 inch long. The invention is not limited to the particular proportions of the fibers and the composite paper may be composed entirely of fibers as short as 0.25 inches and as long as 1.5 inches long fibers, or some percentage of both. The fiber filaments may preferably be about 7–10 microns in diameter but the range of 3–16 microns may be used. Once the alcohol based binder and the fibers are combined together, as with a conventional paper process, in step 122, the combination of the filamentized fibers and the alcohol based binder may be placed on a conveyor to form a web 123 of composite material, such as the composite paper. Then in step 124, the water is removed from the composite paper to produce the dry composite paper. The dry composite paper 126 may be composed of 2–12 percent by weight of polyvinyl alcohol (PVA) and 88–98 percent by weight of the fiber filaments. The preferred composite paper may have 5 percent PVA and 95 percent carbonized PAN based carbon filaments. A plurality of discontinuous carbonized PAN filaments 128 may be randomly oriented within the composite paper such that there may be an entangled mass of filaments within the composite paper held together by the PVA matrix to enhance handleability for further processing.

The utilization of carbonized PAN based and/or carbonized Pitch based carbon fibers in the composite paper eliminates the batch carbonization process that is conventionally required to produce carbon-carbon parts. The PVA aids in binding the carbon filaments together during the stacking, needle-punching and pressing of the FC substrates so that no additional reinforcement is required. The PVA may also have a low flash point so that when the preform composed of FC substrate layers is subjected to the CVD process, as described above, the PVA may be completely driven off of the filaments due to the temperature of the CVD process and the carbon atoms of the CVD process may easily fill in the areas around the filaments vacated by the PVA. Thus, the PVA may hold the filaments together in the composite paper during the initial stacking, needle-punching, and pressing of the preforms, but may then be removed entirely from the filaments during the CVD process. The surface of the preforms made from FC substrates, prior to and after CVD processing, will be described below with reference to FIGS. 10–15.

The combination of the filamentized fibers and the PVA also provide more preform surface area for the carbon atoms to deposit on during the CVD process because the PVA is completely removed from the filaments at the beginning of the CVD process. Therefore a maximum amount of preform surface area is exposed and a maximum number of carbon atoms deposit on the surfaces of the preform. This results in more efficient use of the fibers due to the increased surface area of the preform and subsequent increase in the amount of carbon atoms that may deposit (i.e. densification) on the filaments. Thus, the time required to densify the preform is reduced and less fiber is required, which reduces the cost of the carbon-carbon part.

The production of the FC substrate may also be easily modified to add additional resins and/or materials that may enhance a certain characteristic of the carbon-carbon part. The additional chemicals or materials may be added to the aqueous solution to impart those same chemicals or materials to the composite paper or those same chemicals or materials may be imparted to the FC substrate via a prepregging process. For example, a ceramic may be added to the FC substrate which may adjust the hardness of the substrate and correspondingly the hardness of the carbon-carbon part. As another example, boron micro-particles may be added to the FC substrate so that the carbon-carbon part has a lower coefficient of friction that may be desirable for wear type applications, such as brake discs. As another example, carbon micro-particles may be added to the FC substrate which increases the carbon content of the preform prior to CVD resulting in reduced time and cost of CVD processing. Furthermore, in the case where the preform constitutes a plurality of FC substrates as in a multilayer construction, modifications to the preform properties can be made by altering the properties of the individual FC substrates that are consolidated into the preform. Now, a first embodiment of a method for producing a preform that may be part of the carbon-carbon part production method, in accordance with the invention, will be described.

Figure 5:
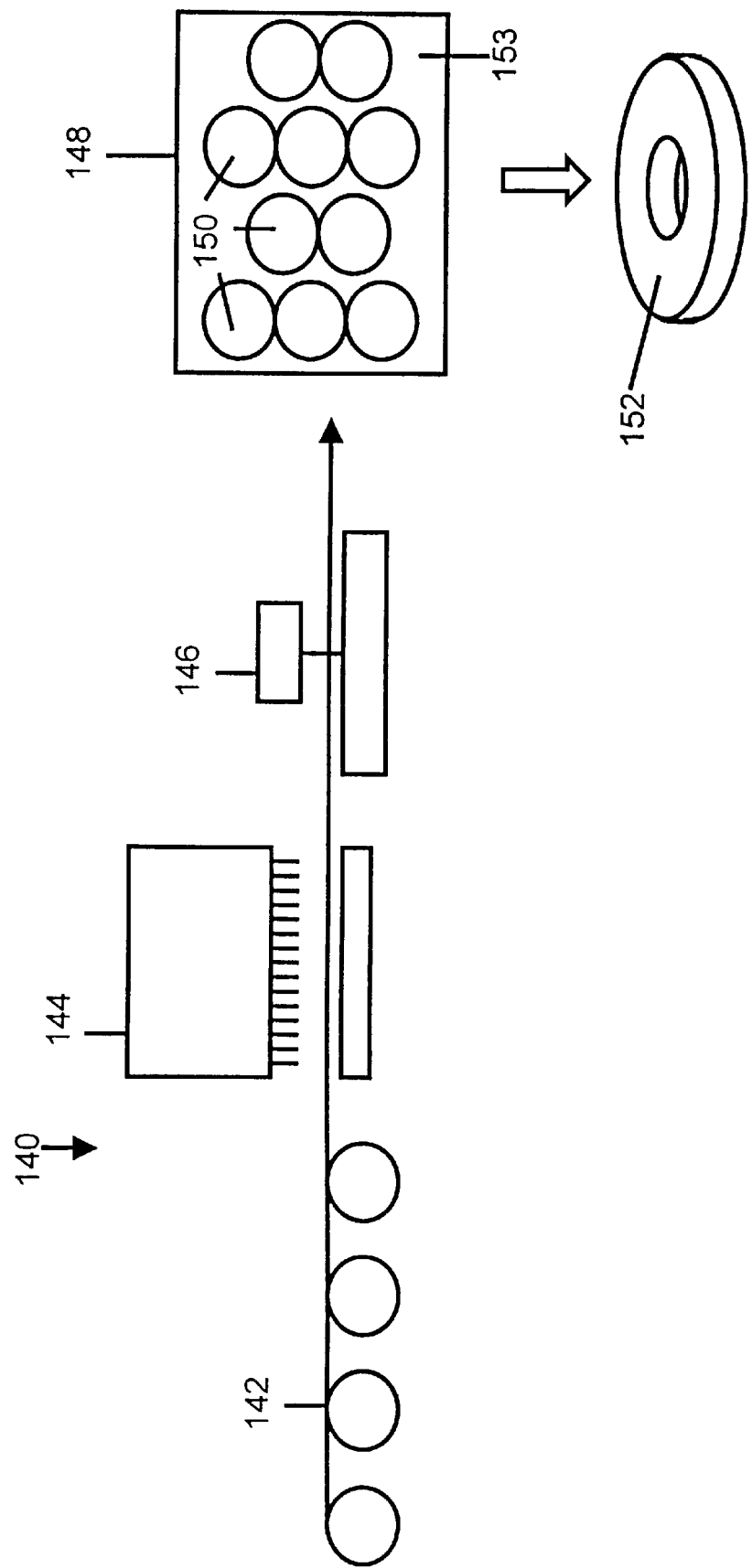
FIG. 5 is a diagram illustrating a first embodiment of a process for producing filamentized composite preforms in accordance with the invention that is part of the overall process of FIG. 3.

FIG. 5 is a diagram illustrating a process 140 for producing a preform from a FC substrate via a needle-punching process that may be part of the production of the carbon-carbon part. First a plurality of FC substrate sheets 142 may be stacked together and fed into a needle loom 144, as is well known, and the stack of FC substrates may be consolidated by needle-punching some of the filaments from an X-Y direction to a Z direction. The height of the FC substrate stack depends on the desired preform thickness for a particular application. Preform thickness for typical applications may range from 0.125 inches to 2 inches. After needle-punching, parts may be cut out of the consolidated layers of FC substrates by a part cutter 146 to make a sheet 148 of cut preforms 150 having the desired shape. The cut parts may then be separated from the sheet 148 to form a plurality of finished preforms 152 that may be densified using the chemical vapor deposition (CVD) process. A portion 153 of the FC substrate sheet not used to produce parts may be recycled in accordance with the invention. Now, a second embodiment of a method for producing a preform that may be part of the carbon-carbon part will be described.

Figure 6:
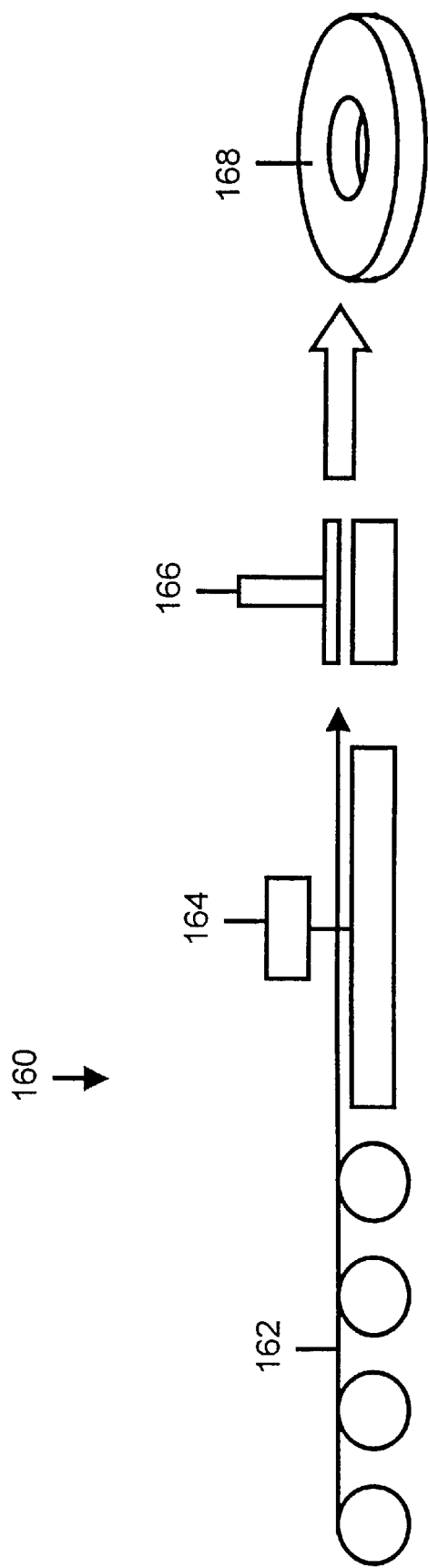
FIG. 6 is a diagram illustrating a second embodiment of a process for producing filamentized composite preforms in accordance with the invention that is part of the overall process of FIG. 3.

FIG. 6 is a diagram illustrating a second method 160 for producing a composite preform from FC substrate sheets. First, a plurality of sheets of FC substrates 162 may be fed into a part cutter 164 which cuts the substrates into the desired shape. For the desired thickness of the preform, the appropriate stack height of cut FC substrates are fed into a presser 166 that may press the layers of FC substrates within the stack together to form a consolidated preform 168 that may then be densified by the CVD process. Either of the methods shown in FIGS. 5 and 6 may be used individually or in a combined process to form the preforms that are later densified, but it is preferred that the FC substrate sheets be needle-punched prior to pressing because the interlaminar strength of the needle-punched preforms is increased.

The pressing cycle for any of the embodiments for a PAN-based substrate may have a pressing time that may be between 2 to 20 minutes, and may preferably be about 7 minutes. The temperature of the pressing may be between 300 to 500 degrees Fahrenheit, and may preferably be about 400 degrees Fahrenheit. The pressure range of the pressing may be between 100 to 2,500 pounds per square inch (psi), and may preferably be about 500 psi. The pressing step may permit the binder to be mingled between the layers of the sandwich which may bind the layers together. The pressing may also decrease the free volume of the sandwich and increase the fiber volume of the preform. The pressing characteristics for a substrate with different filaments may vary depending on the configuration and/or composition of the filamentized preform matrix.

FIG. 7 is a diagram of a third embodiment for forming a preform in accordance with the invention. As shown, a filamentized fiber substrate 180, that may have a plurality of layers, may be pressed by a press 182 and then needled by a needle loom 184 which intermingle the filamentized fibers in each layer of the substrate. Next, a part cutter 186 may cut each circular disc to form a consolidated preform 188 that may then be subjected to the CVD process step.

FIGS. 8 and 9 are diagrams depicting a fourth and fifth embodiment of a method of forming a preform. In both embodiments, a filamentized fiber substrate 190, that may have a plurality of layers, may be needle punched by a needle loom 192. In FIG. 8, the needled substrate may be pressed by a press 194 and cut into discs by a part cutter 196 to form consolidated parts 198. In the embodiment shown in FIG. 9, the needled substrate may be cut into discs and then each disc may be pressed to form the consolidated preforms 198. Now, a sample of the pressed carbon-carbon part, as described above, prior to and after the CVD process will be compared to a needle-punched carbon-carbon part, as described above, prior to and after the CVD process.

Figure 10:
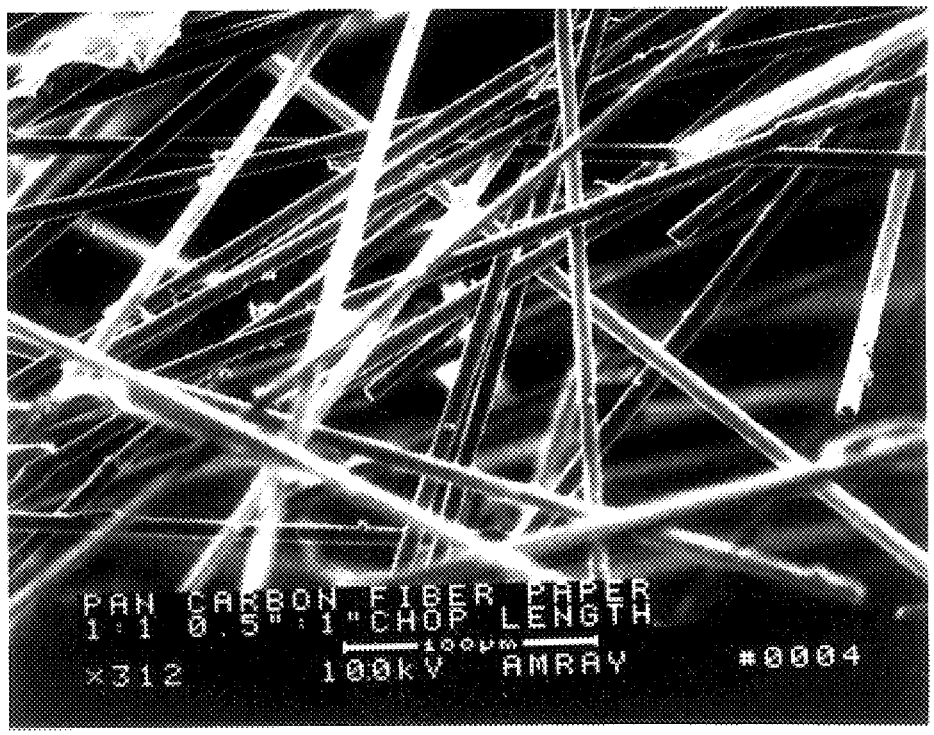
FIG. 10 is a micrograph of a cross-section of a pressed carbon-carbon preform made with the filamentized composite substrate in accordance with the invention prior to the chemical vapor deposition (CVD) process step.
Figure 11:
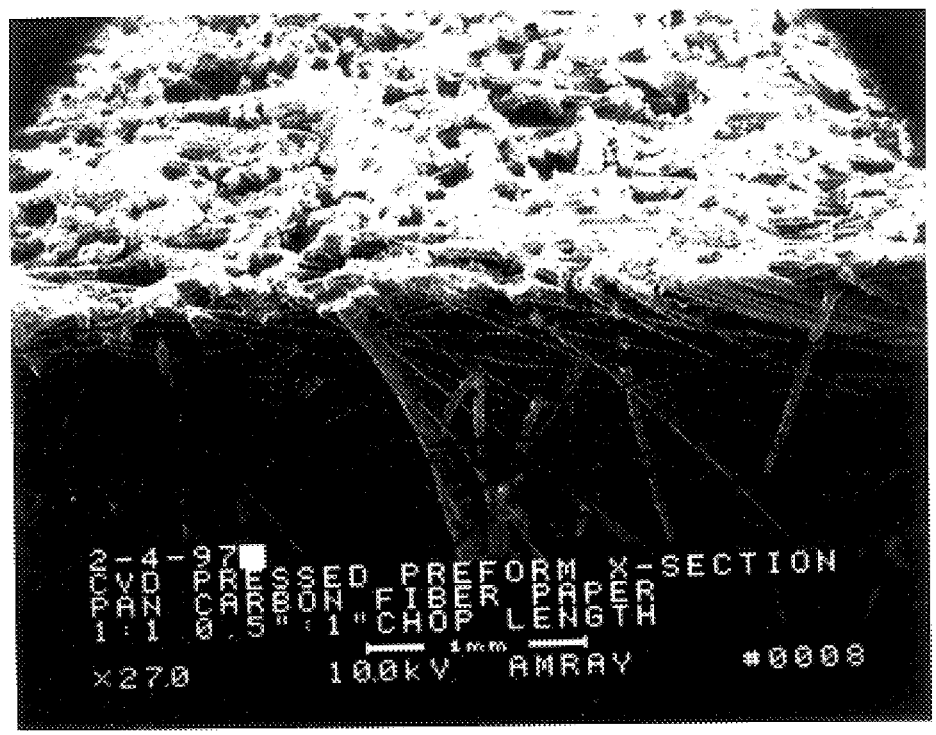
FIG. 11 is a micrograph of a cross-section of a pressed carbon-carbon part in accordance with the invention after the CVD process step.
Figure 12:
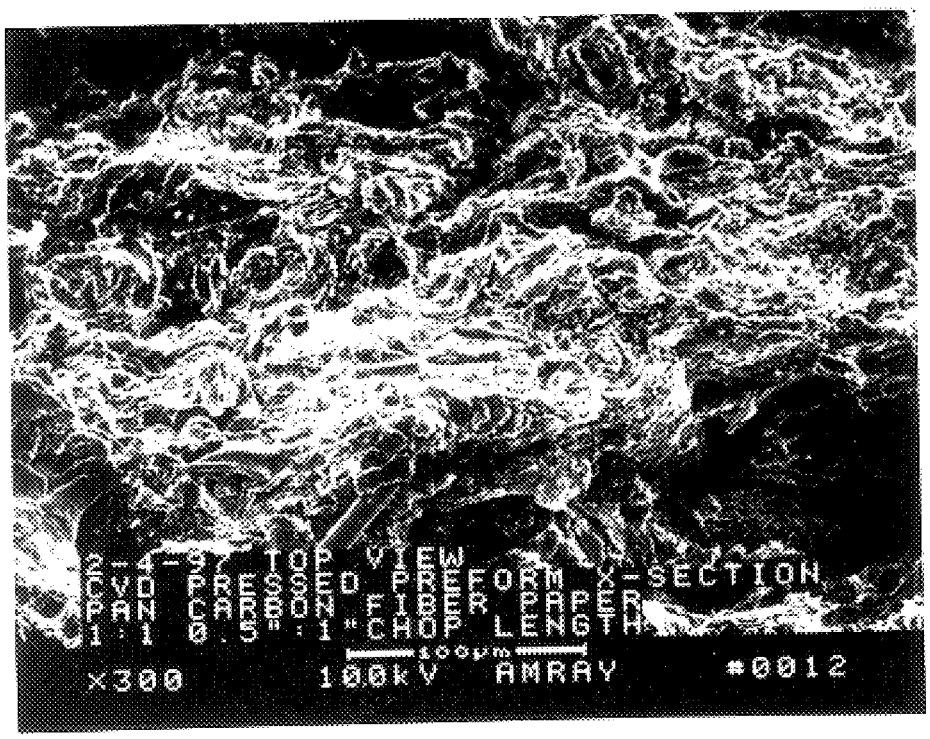
FIG. 12 is a micrograph of a surface of a pressed carbon-carbon part made with the filamentized composite substrate in accordance with the invention after the CVD process step.
Figure 13:
FIG. 13 is a close-up micrograph of a carbon filament coated with carbon atoms from the CVD process.
Figure 14:
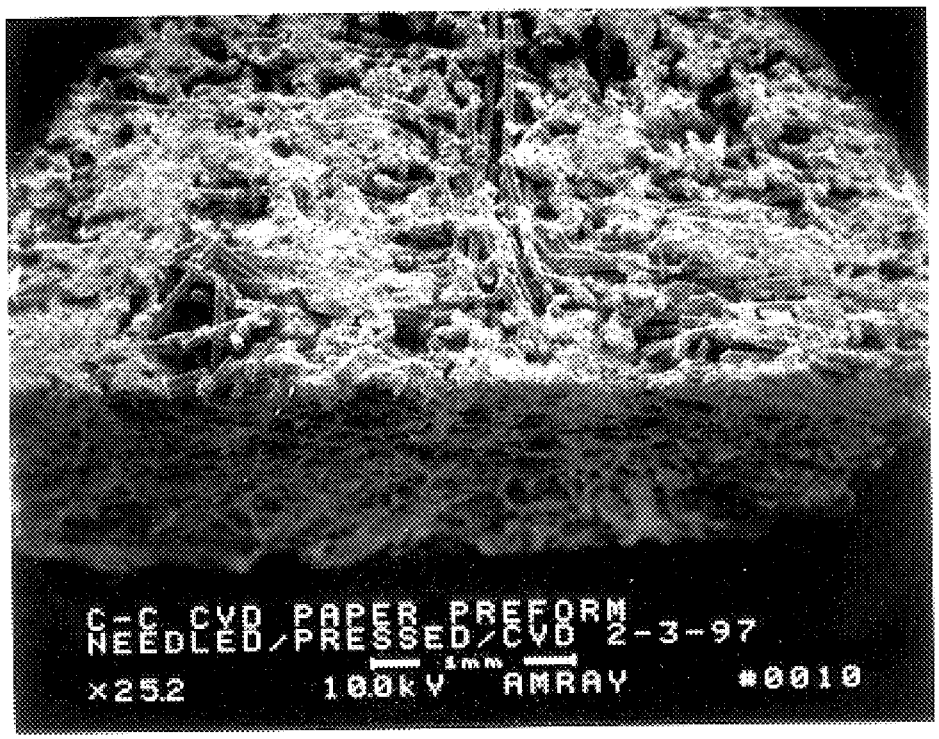
FIG. 14 is a micrograph of a cross-section of a needle-punched carbon-carbon part showing reorientation via needle-punching of the carbon filaments from the X-Y direction to the Z direction, after the CVD process step.
Figure 15:
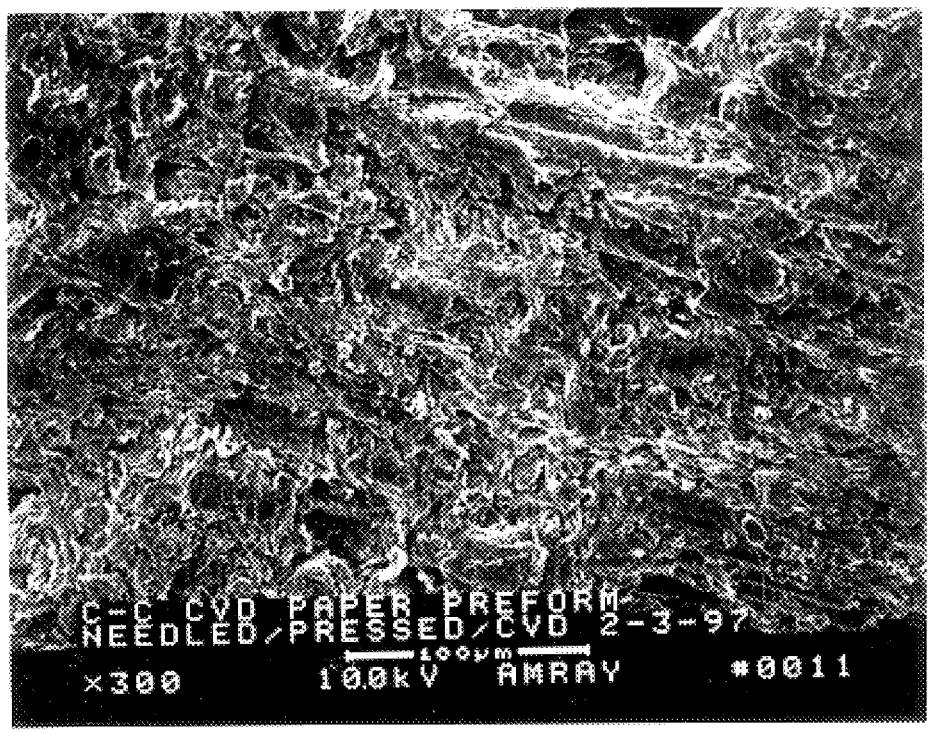
FIG. 15 is a micrograph of a surface of a needle-punched carbon-carbon part in accordance with the invention, after the CVD process step.

FIGS. 10–15 are micrographs depicting the cross-sections and surfaces of the pressed and needle-punched carbon-carbon parts produced that both use the FC substrate. FIG. 10 is a micrograph showing a cross-section of a carbonized polyacrylonitrile (PAN) based carbon fiber preform that has been pressed, as described above with reference to FIG. 6, prior to the CVD process. As shown, the carbon filaments may have some polyvinyl alcohol (PVA) binder bonded to the carbon filaments that will be driven off during the CVD process. The carbon filaments may be generally in the X-Y direction. FIG. 11 is a micrograph showing a top surface of the pressed carbon-carbon part after the CVD process wherein the volume around the carbon filaments has been filled in by the CVD process. FIGS. 12 and 13 are micrographs showing a close-up view of the top surface of the pressed carbon-carbon part. As shown, the surface may have an "onion skin" like carbon morphology formed around the carbon filaments. FIG. 14 is a micrograph of a cross-section of a needle-punched carbon-carbon part after the CVD process. As shown, some of the carbon filaments normally in the X-Y direction have been reoriented into the Z direction due to the needle-punching, which increases the interlaminar strength of the carbon-carbon part. FIG. 15 is a micrograph of a top surface of the needle-punched carbon-carbon part showing the "onion skin" morphology due to the deposited carbon from the CVD process.

A second embodiment of the carbon-carbon part produced using the FC substrate, in accordance with the invention, will now be described. In this embodiment, a resin, such as phenolic resin, may be added or prepregged onto the FC substrate that is described above. With the addition of the resin, the FC substrate must be batch carbonized prior to the CVD process, which has the disadvantages described above. However, the resin prepregged FC substrate has several advantages. The resin based carbon-carbon part has improved friction/wear results that are very desirable for friction applications. In particular, the presence of the phenolic resin in the carbon-carbon part provides a glassy form of carbon that reduces the coefficient of friction of the carbon-carbon part and extends the wear life of the carbon-carbon part in a friction application, such as brake discs. The phenolic resin may be used as a vehicle, such as in a high solids solution, to introduce other wear additives and friction reducing elements into the FC substrate that would otherwise most likely need to be added during the CVD process, further complicating the already lengthy CVD process. The carbonized phenolic resin may also occupy some of the volume in the FC substrate that would otherwise need to be filled in during the CVD process. The carbonized phenolic resin may be concentrated to the interior thickness of the preform where multiple FC substrates or multilayer construction is used. This reduces the overall time and expense of the CVD process. The range of phenolic resins in the embodiment of the carbon-carbon part may be from 2 percent to 60 percent by weight, depending on the particular desired characteristics of the finished carbon-carbon part. Once the resin has been prepregged onto the FC substrate, the FC substrate, as described above, may be carbonized, densified through a CVD process and machined into the finished carbon-carbon part.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method for producing a carbon-carbon part comprising the steps of:

producing a filamentized composite substrate without a batch carbonization step, the substrate comprising a plurality of discontinuous, randomly oriented, carbonized filamentized fibers and a binder that binds said filamentized fibers together to form the filamentized composite substrate; and depositing carbon atoms by chemical vapor deposition at a predetermined temperature onto the filaments such that said carbon atoms replace said binder within said substrate and said carbon atoms densify said substrate to form a carbon-carbon part.

2. The method of claim 1, wherein producing said substrate comprises sandwiching a plurality of filamentized composite substrates together.

3. The method of claim 2, wherein producing said substrate further comprises needle-punching said sandwich of filamentized composite substrates to reorient filaments in a Z plane direction between said substrates within said stack so that the interlaminar strength of the part is increased.

4. The method of claim 2, wherein producing said substrate further comprises pressing said sandwich of filamentized composite substrates together to intermingle said binder in the sandwich layers and increase the fiber volume of the substrate.

5. The method of claim 4, wherein the pressing comprises a pressing cycle time of between about 2 to 20 minutes.

6. The method of claim 5, wherein said pressing cycle time is about 7 minutes.

7. The method of claim 5, wherein the pressing comprises a pressing temperature of between about 300 to 500 degrees Fahrenheit.

8. The method of claim 7, wherein said pressing temperature is about 400 degrees Fahrenheit.

9. The method of claim 7, wherein said pressing comprises a pressing pressure of between about 100 to 2,500 pounds per square inch.

10. The method of claim 9, wherein said pressing pressure is about 500 pounds per square inch.

11. The method of claim 2, wherein said filamentized fibers are selected from the group consisting of polyacrylonitrile (PAN) based carbon, Pitch based carbon, refractory based, and metallic based filaments.

12. The method of claim 11, wherein producing said substrate comprises providing a polyvinyl alcohol (PVA) binder.

13. The method of claim 12 further comprising applying a layer to a surface of said part to reduce the oxidation of said carbon.

14. The method of claim 13, wherein producing said substrate further comprises adding a predetermined chemical to said substrate to enhance a predetermined characteristic of said substrate and said carbon-carbon part.

15. The method of claim 2, wherein producing said substrate comprises sandwiching a plurality of filamentized composite substrate sheets comprising (a) filaments of differing compositions either combined together in alternating ply thickness constructions or (b) filament blends of differing compositions pre-blended into the filamentized composite substrate sheets.

16. The method of claim 14, further comprising the steps of cutting a filamentized substrate; and providing the capability to recycle excess trim from a cut filamentized substrate back into a paper process.

* * * * *

UNITED STATES PATENT AND TRADEMARK OFFICE
CERTIFICATE OF CORRECTION

PATENT NO.    : 6,361,722 B1
DATED         : March 26, 2002
INVENTOR(S)   : William Theys et al.

It is certified that error appears in the above-identified patent and that said Letters Patent is hereby corrected as shown below:

<u>Title page,</u>
ABSTRACT,
Line 8, "from" should read -- form --.

<u>Column 4,</u>
Line 4, "density" should read -- densify --; and
Line 52, "step;" should read -- step; and --.

<u>Column 6,</u>
Line 55, "polyacrilonitrile" should read -- ployacrylonitrile --.

<u>Column 11,</u>
Line 20, "Pitch" should read -- pitch --.

Signed and Sealed this

Eighteenth Day of June, 2002

Attest:

*Attesting Officer*

JAMES E. ROGAN
*Director of the United States Patent and Trademark Office*